(12) United States Patent (10) Patent No.: US 9,383,160 B1
White (45) Date of Patent: Jul. 5, 2016

(54) BOWFISHING REEL

(71) Applicant: Bear Archery, Inc., Evansville, IN (US)

(72) Inventor: David White, Logan, UT (US)

(73) Assignee: Bear Archery, Inc., Evansville, IN (US)

( * ) Notice: Subject to any disclaimer, the term of this patent is extended or adjusted under 35 U.S.C. 154(b) by 375 days.

(21) Appl. No.: 14/155,578

(22) Filed: Jan. 15, 2014

Related U.S. Application Data

(60) Provisional application No. 61/752,704, filed on Jan. 15, 2013.

(51) Int. Cl.
*A01K 89/01* (2006.01)
*F41B 5/14* (2006.01)
*A01K 89/00* (2006.01)

(52) U.S. Cl.
CPC ............. *F41B 5/1488* (2013.01); *A01K 89/006* (2013.01)

(58) Field of Classification Search
CPC ............ A01K 89/01; A01K 89/01029; A01K 89/0108; A01K 89/0102; A01K 89/0111; A01K 89/01121; A01K 91/02
See application file for complete search history.

(56) References Cited

U.S. PATENT DOCUMENTS

| | | | |
|---|---|---|---|
| 1,457,983 A | 6/1923 | Malone | |
| 2,812,756 A | 11/1957 | Myers | |
| 2,817,919 A | 12/1957 | Cress | |
| 2,873,929 A | 2/1959 | Meyer et al. | |
| 2,938,514 A | 5/1960 | Berg | |
| 3,020,666 A * | 2/1962 | Hull | A01K 89/0102 242/311 |
| 3,084,467 A | 4/1963 | Bromwell | |
| 3,105,651 A * | 10/1963 | Hull | A01K 89/0102 242/311 |
| 3,108,583 A | 10/1963 | Andis | |
| 3,129,525 A * | 4/1964 | Lewis | A01K 91/02 124/24.1 |
| 3,142,127 A * | 7/1964 | Mason | A01K 91/02 242/236 |
| 3,185,405 A * | 5/1965 | Hull | A01K 89/0102 242/240 |
| 3,296,731 A * | 1/1967 | Wood | A01K 89/0102 242/240 |
| 3,355,836 A | 12/1967 | Hanson | |
| 3,377,999 A | 4/1968 | Reynolds | |
| 3,522,916 A | 8/1970 | Saunders | |
| 3,614,947 A | 10/1971 | Feldman | |
| 3,652,031 A * | 3/1972 | Kosek | A01K 89/016 242/269 |
| 3,908,927 A * | 9/1975 | Louison | A01K 89/01 242/233 |
| 3,949,730 A | 4/1976 | Schoenberger | |
| 4,024,667 A | 5/1977 | Wegener | |
| D264,988 S | 6/1982 | Finlay | |

(Continued)

*Primary Examiner* — Emmanuel M Marcelo
(74) *Attorney, Agent, or Firm* — Woodard, Emhardt, Moriarty, McNett & Henry LLP (57) ABSTRACT

Embodiments of the present disclosure include a bowfishing reel for use with an archery bow. In certain embodiments, a reel includes an outer cover surrounding a spool of fishing line and an internal mechanism. When an arrow is shot, the fishing line is uncoiled from a spool and pulled out from the outer cover as the arrow travels from the bow. After the arrow and fishing line are paid out, the reel can retrieve the line and arrow. The reel includes a pull handle extending through the outer cover to engage the internal mechanism, with the handle and the internal mechanism being biased in a forward line-release position. When the handle is pulled linearly rearward against the biasing force, the internal mechanism is moved from the line-release position to the line-retrieval position. Release of the handle allows the internal mechanism to automatically return to the line-release position.

19 Claims, 5 Drawing Sheets

(56) References Cited

U.S. PATENT DOCUMENTS

| | | |
|---|---|---|
| 4,383,516 A | 5/1983 | La See |
| 4,674,471 A * | 6/1987 | Lance .................... A01K 81/00 124/86 |
| 4,773,179 A * | 9/1988 | Corley .................... A01K 91/02 124/86 |
| 4,850,548 A * | 7/1989 | Faulkner ................ A01K 89/02 242/256 |
| 4,895,128 A | 1/1990 | Okada |
| 5,038,510 A | 8/1991 | Duke |
| 5,119,579 A | 6/1992 | Hullihen et al. |
| 5,335,439 A | 8/1994 | Horton |
| 5,553,413 A | 9/1996 | Gannon |
| 6,055,764 A | 5/2000 | Armanno, Sr. |
| 6,634,350 B2 | 10/2003 | LaSee |
| 7,216,825 B2 * | 5/2007 | Oishi ................... A01K 89/015 242/247 |
| 7,464,891 B2 * | 12/2008 | Bao-Coutado ....... A01K 89/016 242/249 |
| 2011/0005120 A1 * | 1/2011 | de Koning ............. A01K 87/00 43/19 |
| 2011/0240811 A1 | 10/2011 | Soderberg |
| 2012/0042863 A1 | 2/2012 | Smith et al. |
| 2012/0285430 A1 | 11/2012 | Dunlop et al. |
| 2015/0053195 A1 * | 2/2015 | Soderberg ............ A01K 91/02 124/88 |

\* cited by examiner

BOWFISHING REEL

CROSS-REFERENCE TO RELATED APPLICATION

This application claims the benefit of U.S. Provisional Patent Application No. 61/752,704, filed Jan. 15, 2013, which is hereby incorporated by reference in its entirety.

FIELD OF THE INVENTION

The present invention relates generally to archery bows and more particularly pertains to a bowfishing reel assembly for use with and mountable to archery bows.

BACKGROUND OF THE INVENTION

Certain archery bows are used for bowfishing. In such arrangements, a fishing line is attached to an arrow and the line is paid out from a reel arrangement on the bow when the arrow is shot. After the arrow is shot, the reel arrangement can be used to draw the line and arrow back towards the bow.

SUMMARY OF THE INVENTION

Embodiments of the present disclosure include a bowfishing reel for use with an archery bow. In certain embodiments, a reel includes an outer cover surrounding a spool of fishing line and an internal mechanism. When an arrow is shot, the fishing line is pulled through a gap between the internal mechanism and the cover, uncoiling the line from a spool and allowing the fishing line to be freely paid out through a front hole in the outer cover as the arrow travels from the bow. After the arrow and fishing line are paid out, the reel can retrieve the line and arrow. The reel includes a pull handle extending through the outer cover to engage the internal mechanism, with the handle and the internal mechanism being biased in a forward line-release position. When the handle is pulled linearly rearward against the biasing force, the internal mechanism is moved from the line-release position to the line-retrieval position. Turning the crank during retrieval rewinds the fishing line around the spool, thereby retrieving the arrow. Release of the handle allows the internal mechanism to automatically return to the line-release position.

Other objects and attendant advantages will be readily appreciated as the same become better understood by references to the following detailed description when considered in connection with the accompanying drawings.

DESCRIPTION OF THE ILLUSTRATED EMBODIMENTS

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles being contemplated as would normally occur to one skilled in the art to which the invention relates.

Embodiments of the present disclosure include a bowfishing reel assembly for an archery bow. In certain arrangements, the reel assembly is in a forward default or free or line-release position while the bow is drawn and released, allowing a fishing line to freely be paid out as the arrow travels from the bow. After the arrow and fishing line are paid out, pulling a handle engages a pin towards the cover of the assembly to move the assembly into a rearward line-retrieval position. While the handle is pulled out, a crank is rotated and rotates the pin around the interior of the assembly, engaging the line and then recoiling the line to pull the line and the arrow back towards the bow. After the line or arrow is retrieved, releasing the handle disengages the pin and automatically returns the assembly to the free line-release position.

Figure 1:
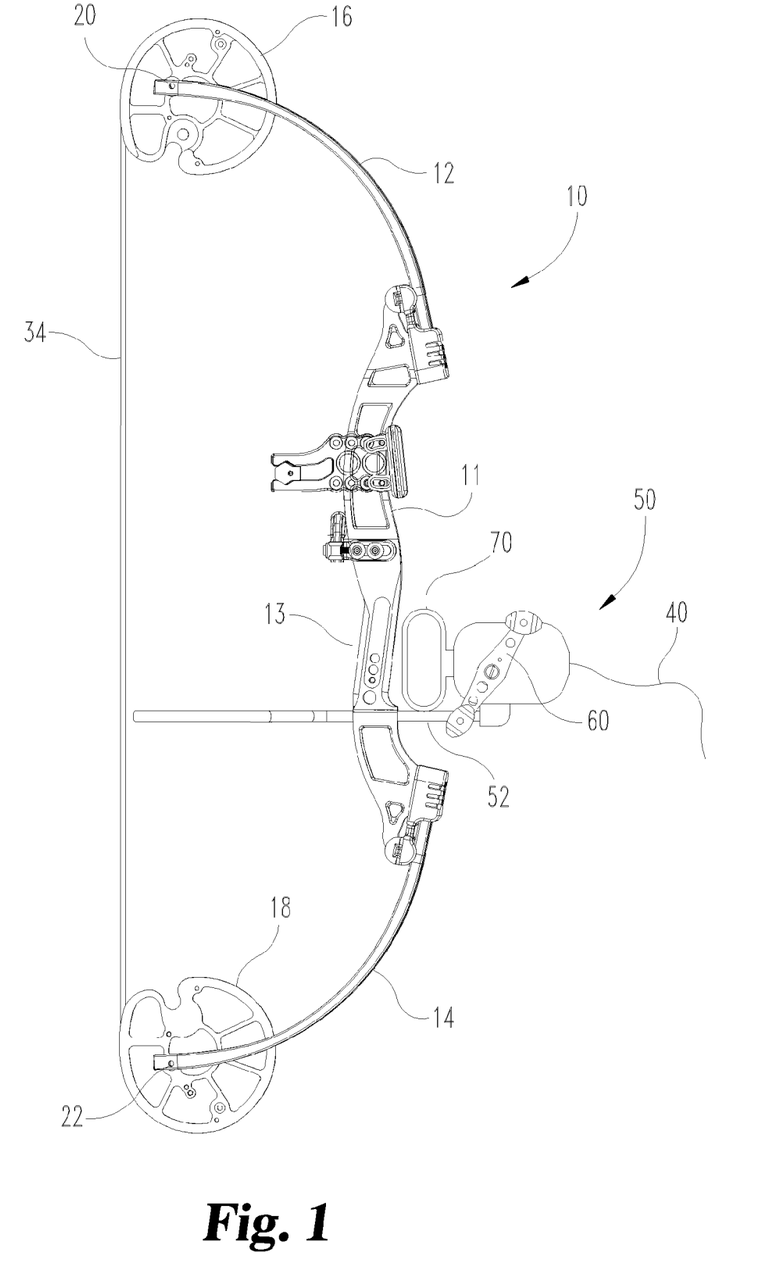
FIG. 1 is a perspective view of an archery bow in an undrawn position incorporating a bowfishing reel assembly according to a preferred embodiment of the present disclosure.

FIG. 1 illustrates an example of a bowfishing reel 50 mounted on a conventional dual cam compound archery bow generally designated as 10. When viewed from the perspective of an archer holding the bow, it includes a riser 11 with a handle 13, an upper limb portion 12 and a lower limb portion 14 forming a bow body. A mount 52 adjustably connects the reel arrangement 50 to bow 10. In the dual cam bow example illustrated, rotational members such as cams 16 and cam 18 are supported at the limb tip sections for rotary movement about axles 20 and 22. In the embodiment shown, upper and lower limbs are formed of parallel and symmetric limb portions sometimes called quad limbs. Alternately, a single piece limb can have a notch or slot area removed to allow a rotational element to be mounted to the limb tip. An upper pulley axle 20 is carried between the outer limb tip portions of upper limb 12. A lower pulley axle 22 is carried between the outer limb tip portions of lower limb 14.

The portion of the cable which defines the bowstring cable 34 includes an upper portion and a lower end portion which are fed-out from cams 16 and 18 when the bow is drawn. The non-bowstring portions of the cable arrangement including return or cross cables extending between the cams and/or limb tips are not illustrated for ease of reference. Each cable has a thickness and one or more strands forming a round cross-section defining a circumference. From the perspective of the archer, the bowstring is considered rearward relative to the riser which defines forward. Directional references herein are for ease of explanation and are not intended to be limiting. Similarly, a bow riser handle held with the left hand is illustrated, but is not intended to be limiting. A symmetric arrangement can be used with a bow having a right-handed riser.

When the bowstring 34 is drawn, it causes cams 16 and 18 at each end of the bow to rotate, feeding out cable and bending limb portions 12 and 14 inward, causing energy to be stored therein. When the bowstring 34 is released with an arrow engaged to the bowstring, the limb portions 12 and 14 return to their rest position, causing cams 16 and 18 to rotate in the opposite direction, to take up the bowstring 34 and launch the arrow with an amount of energy proportional to the energy initially stored in the bow limbs. Bow 10 is described for illustration and context and is not intended to be limiting.

Certain embodiments can also be used with single or hybrid cam compound bows. A single cam bow includes a similar riser with a handle, upper limb portions, and lower limb portions. Rotational members such as an upper idler wheel and a lower eccentric cam are supported at the limb tip sections for rotary movement about their axles. A bowstring cable includes an upper end fed-out from the upper wheel and a lower end mounted to and fed-out from the lower cam when the bow is drawn. A return cable portion has an upper end wrapped around the upper cam and a lower end mounted to the lower cam, with the lower end fed-out from cam as the bow is drawn. Additionally, a y-yoke anchor cable has a lower end mounted to the lower cam and two upper ends mounted to the axle of the upper cam. The lower end is taken in to the lower cam as the bow is drawn. References herein to a bowstring or cable portion extending to the limb tips are intended to broadly include a cable portion wrapped around or mounted to a track of a rotational element or an attachment to an axle mounted at the limb tips.

The present disclosure can also be used in other types of bows, for example recurve, hybrid cam bows, or crossbows, which are all considered conventional for purposes of the present invention. For convenience, the combination of riser 11 and either single or quad limbs forming upper limb 12 and lower limb 14 may generally be referred to as an archery bow body. It should be appreciated that the archery bow body can take on various designs in accordance with the many different types of bows.

In one form, a reel assembly 50 includes a pull handle 70 and a mount 52 adapted for mounting to an archery bow 10. Preferably, reel assembly 50 may be mounted near riser handle 13 such that pull handle 70 is forward of riser handle 13. In this arrangement an archer may hold the archery bow 10 with one hand and operate pull handle 70 with the extended fingers of the same hand. In some arrangements, the reel assembly 50 also includes crank 60 on one side that may be operated with the archer's other hand. For example, in a bow held with the left hand, the left hand may also be used to operate the pull handle 70 while crank 60 may be positioned on the right side of reel assembly 50 for convenient operation using the right hand.

The reel assembly 50 may store a fishing line 40 with one end of the line anchored inside of the assembly and the other end of the line connectable to an arrow which can be shot from the bow. When an archer shoots the arrow from bow 10, the arrow preferably freely pulls the fishing line from the reel assembly during flight for the distance of the flight. After the arrow's flight has ended, reel assembly 50 may preferably be used to draw the line into the reel assembly 50. A crank 60 is operated by the archer to draw the line and arrow toward the bow.

Figure 2:
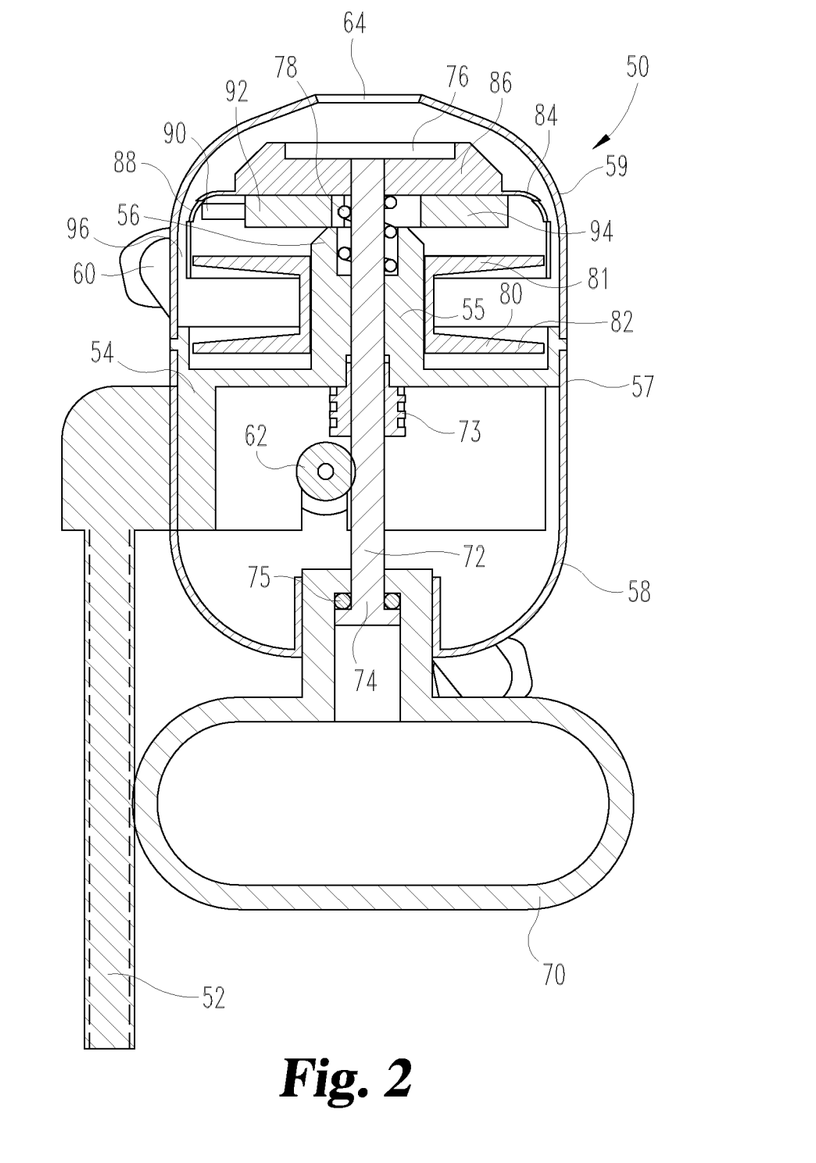
FIG. 2 is a left side cross-sectional view of a bowfishing reel assembly in a release position according to a preferred embodiment.
Figure 3:
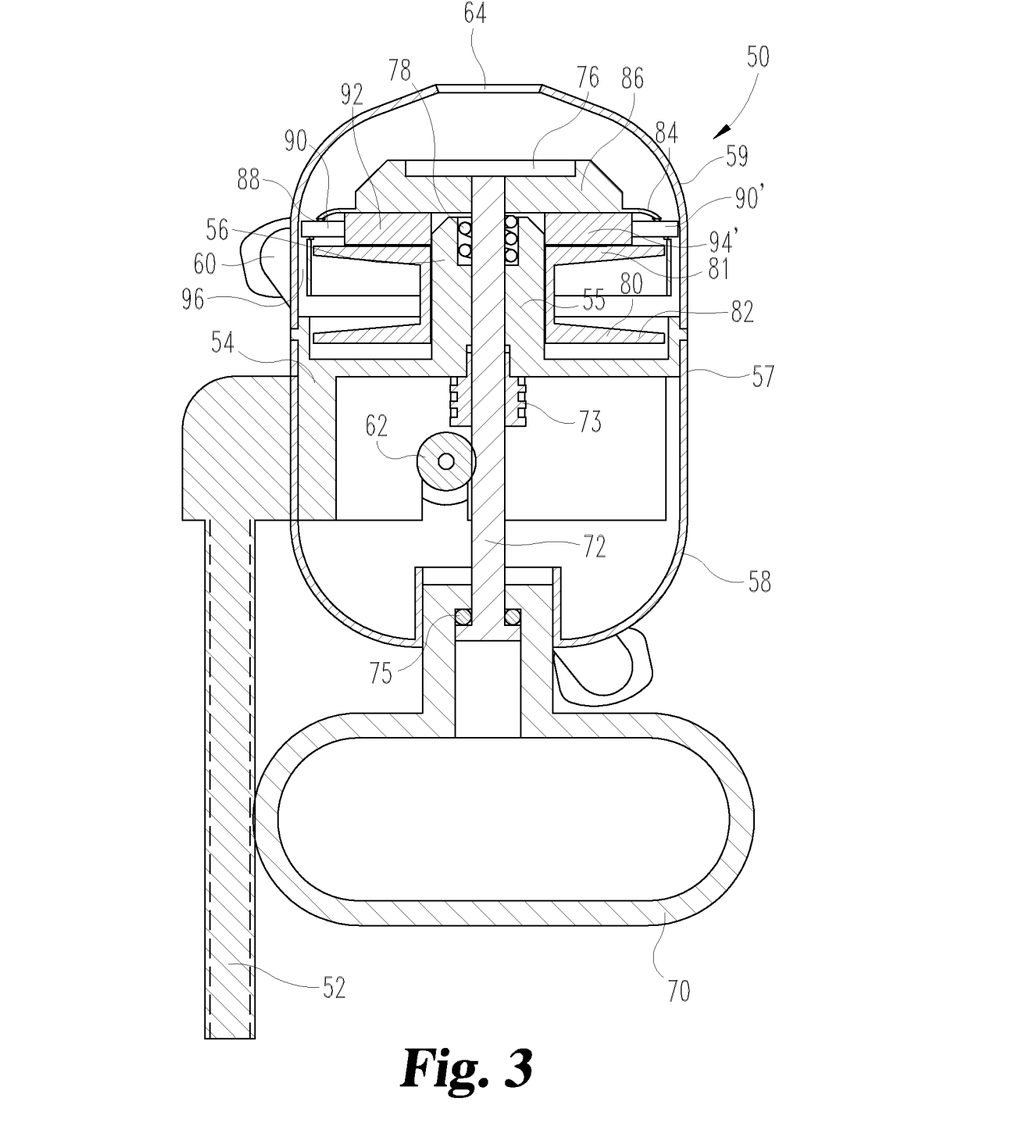
FIG. 3 is a left side cross-sectional view of the bowfishing reel assembly of FIG. 2 in a retrieving position.

FIGS. 2-3 illustrate the internal mechanism of reel assembly 50. Reel assembly 50 includes a base 54 that connects assembly 50 to mount 52 as well as supporting other internal structures of the reel assembly. Reel assembly 50 also includes a cover 57 which is substantially circular in cross-section. In describing the reel assembly, the center of a circular cross-section or the central axis of the assembly defines inward while the cover 57 is considered outward. Pull handle 70 is considered rearward of cover 57 and the direction opposite pull handle 70 defines forward. Cover 57 may comprise two or more sections such as forward cover 59 and rearward cover 58. Forward cover 59 preferably defines line opening 64 at or near the forward-most section of forward cover 59. Center column 55 defines a substantially cylindrical passage, and also defines a shoulder 56 along a forward portion at a distal end thereof extending into a shroud or dome 84. Shoulder 56 may optionally have what can be characterized as a sloped or arcuate profile where the outer edge of column 55 narrows towards the front of assembly 50. In the particular illustrated embodiment, center column 55 is fixed in position and non-rotating. Spindle or spool 80 may be disposed around column 55 and defines forward flange 81 and rearward flange 82.

Pull handle 70 extends from the rear of assembly 50, for example through an opening in rearward cover 58. Pull handle 70 may engage rearward end 74 of an internal center shaft 72. Internal center shaft 72 extends through the cylindrical passage of center column 55 along a center rotation axis and further defines a forward end 76. Forward end 76 may define or be non-rotatably joined to shroud base 86. Shroud base 86 may be rotatably mounted within assembly 50.

A biasing element may be included to resiliently bias the position of the shaft and shroud base toward the front of the assembly and thus into the line-release position. For example, the biasing element may be a spring 78 disposed around shaft 72 near forward end 76 and be positioned between shroud base 86 and column 55. Spring 78 may optionally extend into a recess disposed towards the forward end of center column 55. Shroud or dome 84 extends outward from shroud base 86 before curving backwards to enclose the outer edge of forward flange 81 of spool 80. The outer diameter of dome 84 is sized to define a gap 96 between the inside surface of cover 57 and shroud 84. Pin base 92 is connected to shroud base 86 and is slidable along a radius of shroud base 86. Pin base 92 is biased inward toward the central axis of the reel assembly and is arranged adjacent the distal end of the central column 55. Tab or pin 90 may extend from the outward end of pin base 92. Shroud or dome 84 defines a side exit hole or channel 88 radially outward from pin 90. When pin base 92 is moved radially outward from a first inward position to a second outward position, pin or tab 90 extends outward through the associated hole 88 in the shroud 84, such that the pin 90 extends into the gap 96.

Preferably, crank 60 is positioned outside of covers 58, 59. Crank 60 may be used to drive crank gear 62 which may turn shaft 72. Rollers or bearings 73 may be included between shaft 72 and the cylindrical passage of the center column 55 to reduce friction. Similarly, bearing 75 may preferably be included between shaft rearward end 74 and pull handle 70 to reduce friction and further facilitate rotation of shaft 72 when crank 60 and gear 62 are engaged to drive the shaft 72.

In the reel assembly's default, free, disengaged or line-release position, as illustrated in FIG. 2, spring 78 pushes shaft 72, shroud base 86, and shroud 84 forward. Pin 90 is positioned at the inward position and the gap 96 between shroud 84 and cover 57 is unobstructed. In this position, a fishing line may be freely paid out from the reel assembly 50 when an arrow is released.

In the retrieving or engaged position, as illustrated in FIG. 3, pull handle 70 is pulled linearly rearward against the biasing force, compressing spring 78. As handle 70 is pulled rearward, pin 90 is mechanically activated to extend radially outward through the side exit hole 88 in shroud 84. In the particular illustrated example, as shroud base 86 is pulled rearward, pin base 92 contacts shoulder 56. As pin base 92 moves rearward, it shifts outward along the profile of shoulder 56, shifting pin 90 outward through hole 88 to at least partially obstruct gap 96. When crank 60 is rotated to drive shaft 72, shroud 84 with extending pin 90 also rotates. As pin 90 rotates, it engages the fishing line 40 to rewind the line around spool 80. By covering the outer edge of forward flange 81, the shroud 84 assists in ensuring that fishing line 40 retrieved by the assembly winds around spool 80 rather than wrapping around other parts of the assembly.

When pull handle 70 is released, spring 78 at least partially decompresses, pushing shroud 84, shroud base 86, and shaft 72 forward to automatically return the assembly to the line-release position. Pin 90 and pin base 92 are biased to return inward and retract into the shroud, returning the assembly to the free position of FIG. 2. Thus, an archer cannot accidentally fire an arrow with a locked reel, avoiding potential injury or equipment malfunction or damage.

In some forms, counterbalance 94 (FIG. 2) is attached to shroud base 86 opposite pin base 92. In this arrangement, substantially balanced weights around the central axis of the reel assembly may reduce vibrations or smooth operation of the reel assembly when unwinding or winding the line. According to other arrangements, as shown in FIG. 3, part 94' is an additional pin base that includes a pin 90' that can be extended through shroud 84 to at least partially obstruct gap 96. Use of multiple pin structures may increase responsiveness of the assembly in engaging the line during retrieval or mitigate interruptions in winding if the fishing line avoids engaging another pin in the assembly 50.

As illustrated, the reel assembly is characterized as a fixed-spool design, sometimes called a spinning reel, where, as the line is fed out, the spool remains in a fixed position and the line, in some positions, uncoils freely from spool 80 through the gap 96 between shroud 84 and forward cover 59. Other reel types, such as a baitcasting or revolving spool design, sometimes called a conventional reel, are also suitable for use in the disclosure. In a conventional reel, a crank, linkage, and one or more gears rotate the spool. The shaft, shroud base, and shroud do not rotate when the crank is turned. In the free position, pin is retracted inside of the shroud, leaving a gap between the shroud and cover unobstructed. In this arrangement, a projected arrow can freely pull line from the spool by both rotating the spool and unlooping the line from around the edge of the shroud. Pulling the handle extends the pin from the shroud, allowing a rotating spool to rewind the line without unlooping the line through the gap between the edge of the shroud and the cover. Preferably, the assembly may include one of several braking systems known in the art to prevent or reduce overrotation of the spool or internal tangling of the line.

Optionally, the crank 60 and gear assembly 62 also operate a line guide (not shown) that moves forward and rearward along the spool to promote even winding of the line around the spool. A line guide may improve performance of the reel assembly in both spinning reel and conventional reel configurations.

Figure 4:
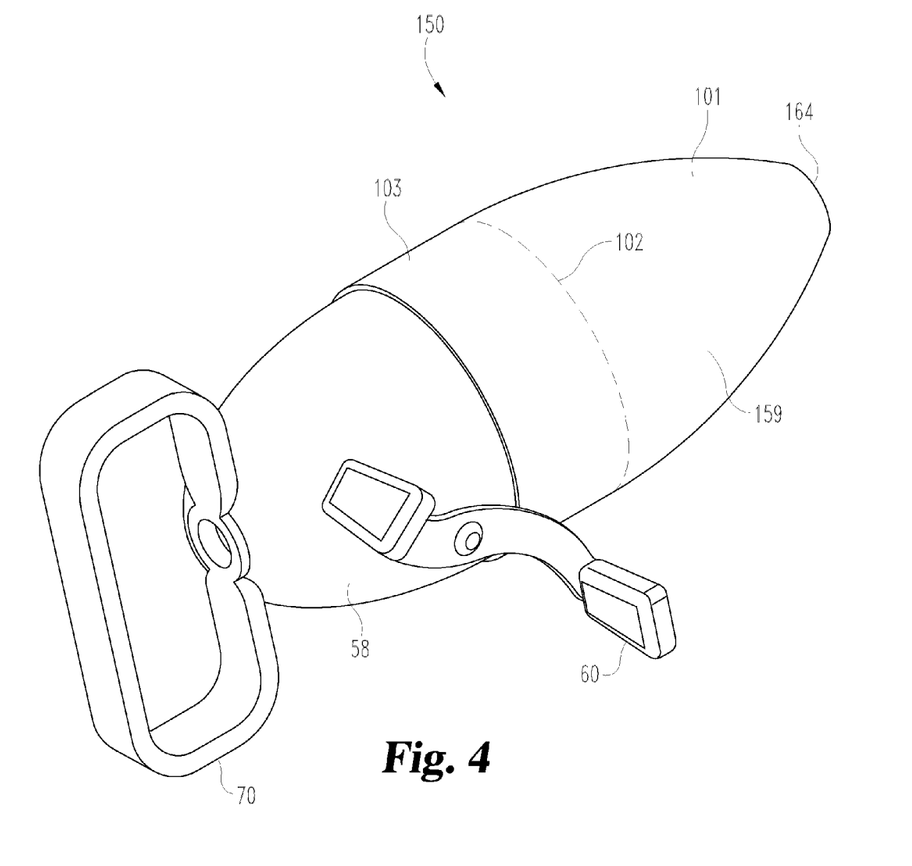
FIG. 4 is a perspective view of another embodiment of the bowfishing reel assembly.

FIG. 4 shows another embodiment of the present disclosure. A bowfishing reel assembly is generally designated 150. According to some aspects, forward cover 159 can take on an elongated, extended, or stretched shape in comparison to the embodiment depicted in FIGS. 1-3. In some forms, elongated or conical forward cover 159 preferably assists in allowing smoother travel of the fishing line during release or retrieval of fishing line and an arrow. In some configurations, forward cover 159 approximates an ellipsoid truncated by line opening 164 and the forward end of rearward cover 58, where forward cover 159 meets rearward cover 58. Preferably, two of the axes of said ellipsoid are of equal length, resulting in a shape that is substantially a spheroid truncated at both ends. Thus, cross-sections of forward cover 159 may be substantially circular.

In some options, forward cover 159 may be shaped as two smoothly connected geometric forms. For example, forward cover 159 may have a first segment 101 and a second segment 103, wherein the first segment 101 approximates a truncated ellipsoid, spheroid, or cone and the second segment 103 approximates a cylinder. In other arrangements, second segment 103 may define a truncated ellipsoid, spheroid, or cone. Cover 159 may transition smoothly from one segment to another where, for instance, the radius of first segment 101 is substantially equal to the radius of second segment 103 at the plane 102 where the two segments merge. As illustrated in FIG. 4, the cross-sectional radius of first segment 101 expands from front to rear before meeting second segment 103 at plane 102. Second segment 103 may, from plane 102 and rearward, have either a fixed or varying cross-sectional radius. Similarly, rearward cover 58 may be shaped to approximate a truncated ellipsoid, spheroid, or cone truncated by pull handle 70 or the rearward end of forward cover 159. In certain arrangements, the internal mechanisms of the assembly, such as those depicted in FIGS. 2 and 3, can be elongated or shaped to correspond with the various forms that forward cover 159 or rearward cover 58 may take.

When forward cover 159 or a segment thereof approximates a truncated spheroid, the surface may be represented, in Cartesian coordinates, as $$\frac{x^2 + y^2}{a^2} + \frac{z^2}{c^2} = 1$$

where the z-axis corresponds to the shaft of the reel assembly. In this arrangement, preferred ranges for the proportion of c/a include from about $\sqrt{2}$ to about $\sqrt{30}$.

Figure 5:
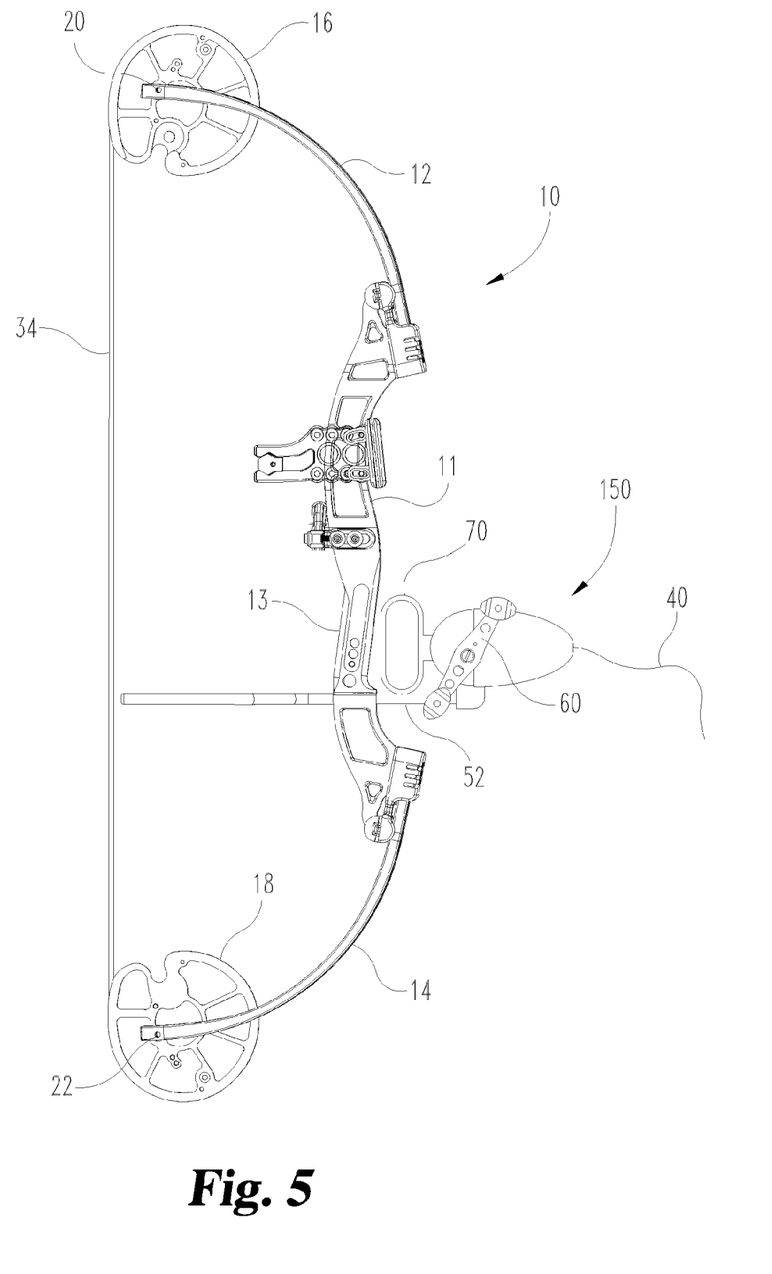
FIG. 5 is a perspective view of an archery bow in an undrawn position incorporating the bowfishing reel assembly of FIG. 4.

FIG. 5 illustrates an archery bow incorporating an embodiment of the reel assembly 150 described in connection with FIG. 4. The features of an archery bow are described in connection with FIG. 1. The reel assembly 150 may include a mount 52 adapted for mounting to the archery bow 10. Preferably, reel assembly 150 may be mounted near handle 13 such that pull handle 70 is forward of handle 13. The reel assembly 150 may store a fishing line 40 with one end of the line anchored inside of the assembly and the other end of the line connectable to an arrow which can be shot from the bow. When an archer shoots the arrow from bow 10, the arrow preferably freely pulls the fishing line from the reel assembly during flight for the distance of the flight. After the arrow's flight has ended, reel assembly 150 may preferably be used to draw the line into the reel assembly 150. A crank 60 is operated by the archer to draw the line and arrow toward the bow.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A bowfishing reel mountable on an archery bow for use with a fishing line, the bowfishing reel comprising:
    an outer cover defining a front opening through which fishing line travels;
    an internal mechanism positioned within and surrounded by the outer cover;
    a spool positioned within and surrounded by the outer cover, wherein the fishing line is configured to be wound around the spool;
    a pull handle extending through the outer cover and engaging the internal mechanism;

wherein the internal mechanism and the pull handle are linearly movable between a forward line-release position and a rearward line-retrieval position, and are biased to be positioned at the line-release position;

wherein the pull handle is configured to be pulled rearward against the biasing force to move the internal mechanism rearward from the line-release position to the line-retrieval position, and wherein release of the pull handle allows the internal mechanism to automatically return to the line-release position.

2. The bowfishing reel of claim 1, further comprising a crank assembly coupled to the internal mechanism, wherein rotation of the crank causes the internal mechanism to engage the fishing line to wind the fishing line around the spool within the outer cover.

3. The bowfishing reel of claim 1, wherein the internal mechanism includes a center shaft rotatably engaged with the pull handle and extending along a center rotation axis.

4. The bowfishing reel of claim 3, wherein the internal mechanism includes:
 a shroud rotatable engaged with the center shaft and rotatable about the center axis along with the center shaft, wherein the outer cover and the shroud define a gap therebetween, wherein the shroud defines a side exit hole;
 a pin rotatable about the center axis along with the shroud, wherein the pin is positioned within the shroud when the reel is in the line-release position and wherein the pin extends at least partially through the side exit hole into the gap to engage the fishing line when the reel is in the line-retrieval position.

5. The bowfishing reel of claim 4, wherein the internal mechanism includes a center column surrounding the center shaft and extending at least partially within the shroud, wherein the center column is fixed in position and non-rotating, and wherein the center column includes a distal end positioned within the shroud and having a sloping profile.

6. The bowfishing reel of claim 5, wherein the internal mechanism includes a pin base to which the pin is engaged, wherein the pin base is arranged adjacent the distal end of the column, whereby pulling the handle from the line-release position to the line-retrieval position moves the pin base along the sloping profile of the center column causing the pin to move radially outward to extend at least partially through the side exit hole into the gap.

7. The bowfishing reel of claim 1, wherein the spool is configured to remain fixed in position when the fishing line is wound around the spool.

8. The bowfishing reel of claim 1, wherein the cover includes a front portion shaped substantially as an ellipsoid.

9. The bowfishing reel of claim 1, further comprising a spring constructed and arranged to impart the biasing force to bias the internal mechanism and the pull handle into the line-release position.

10. A bowfishing reel mountable on an archery bow for use with a fishing line, the bowfishing reel comprising:
 an outer cover defining a front opening through which fishing line travels and a rear opening, wherein the direction from the front opening to the rear opening is a rearward direction and the direction from the rear opening to the front opening is a forward direction;
 a pull handle extending through the outer cover at the rear opening;
 a center shaft engaged with the pull handle;
 a biasing mechanism constructed and arranged to bias the center shaft and the pull handle in the forward direction;

wherein the pull handle is configured to be pulled linearly in the rearward direction against the biasing force of the biasing mechanism to move the center shaft in the rearward direction.

11. The bowfishing reel of claim 10, further comprising a crank assembly coupled to the center shaft and a spool positioned within the outer cover about which the fishing line is configured to be wound, wherein rotation of the crank causes the fishing line to wind around the spool.

12. The bowfishing reel of claim 10, further comprising:
 a shroud rotatable engaged with the center shaft and rotatable about the center axis along with the center shaft, wherein the outer cover and the shroud define a gap therebetween, wherein the shroud defines a side exit hole;
 a pin rotatable about the center axis, wherein the pin is positioned within the shroud when the reel is in the line-release position and wherein the pin extends at least partially through the side exit hole into the gap to engage the fishing line when the reel is in the line-retrieval position.

13. The bowfishing reel of claim 12, wherein the internal mechanism includes a non-rotating, fixed center column surrounding the center shaft and extending at least partially within the shroud, wherein the center column includes a distal end positioned within the shroud and having a sloping profile.

14. The bowfishing reel of claim 13, wherein the internal mechanism includes a pin base to which the pin is engaged, wherein the pin base is arranged adjacent the distal end of the column, whereby pulling the handle from the line-release position to the line-retrieval position causes the pin base to be pulled in the rearward direction along the sloping profile of the distal end of the center column and thereby moved radially outward such that the pin extends at least partially through the side exit hole into the gap.

15. The bowfishing reel of claim 10, wherein the cover includes a front portion shaped substantially as an ellipsoid.

16. The bowfishing reel of claim 10, wherein the biasing mechanism is a spring.

17. A bowfishing reel mountable on an archery bow and movable between a forward fishing line-release position and a rearward fishing line-retrieval position, the bowfishing reel comprising:
 an outer cover defining a front opening through which fishing line travels and a rear opening, wherein the outer cover includes an inside surface;
 a pull handle extending through the outer cover at the rear opening;
 a center shaft rotatably engaged with the pull handle and extending along a center rotation axis;
 a shroud engaged with the center shaft and rotatable about the center axis along with the center shaft, wherein the inside surface of the outer cover and the shroud define a gap therebetween, wherein the shroud defines a side exit hole;
 a pin rotatable about the center axis, wherein the pin is moveable in a linear direction between a first position and a second position; wherein, at the first position, the pin is positioned within the shroud and, at the second position, the pin extends at least partially through the side exit hole into the gap;
 a biasing mechanism constructed and arranged to bias the center shaft, the shroud, the pin and the pull handle to the forward line-release position;
wherein the pull handle is configured to be pulled linearly rearward against the biasing force of the biasing mechanism to move the center shaft, the shroud and the pin into the rearward line-retrieval position.

18. The bowfishing reel of claim 17, wherein the cover includes a front portion shaped substantially as an ellipsoid.

19. The bowfishing reel of claim 17, further comprising:
a non-rotating, fixed center column surrounding the center shaft and extending at least partially within the shroud, wherein the center column includes a distal end positioned within the shroud and having a sloping profile;
a pin base to which the pin is engaged, wherein the pin base is arranged adjacent the distal end of the column, whereby pulling the handle from the line-release position to the line-retrieval position moves the pin base along the sloping profile of the center column causing the pin to move radially outward and extend at least partially through the side exit hole into the gap.

* * * * *